United States Patent
Yang et al.

(10) Patent No.: US 10,801,725 B2
(45) Date of Patent: Oct. 13, 2020

(54) SWIRLER FOR GAS TURBINE

(71) Applicant: HANWHA AEROSPACE CO., LTD., Changwon-si (KR)

(72) Inventors: Si Won Yang, Changwon-si (KR); Seung Chai Jung, Changwon-si (KR); Sinhyun Kim, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 212 days.

(21) Appl. No.: 15/106,571

(22) PCT Filed: Mar. 21, 2014

(86) PCT No.: PCT/KR2014/002387
§ 371 (c)(1),
(2) Date: Jun. 20, 2016

(87) PCT Pub. No.: WO2015/093685
PCT Pub. Date: Jun. 25, 2015

(65) Prior Publication Data
US 2016/0334104 A1 Nov. 17, 2016

(30) Foreign Application Priority Data
Dec. 19, 2013 (KR) .......... 10-2013-0159386

(51) Int. Cl.
*F23R 3/14* (2006.01)
*F23R 3/28* (2006.01)
*F02C 7/22* (2006.01)

(52) U.S. Cl.
CPC .......... *F23R 3/14* (2013.01); *F02C 7/22* (2013.01); *F23R 3/286* (2013.01); *F05D 2220/32* (2013.01); *F23C 2900/07001* (2013.01)

(58) Field of Classification Search
CPC .... F23R 3/14; F23R 3/286; F02C 7/22; F05D 2220/32; F23C 2900/07001
(Continued)

(56) References Cited

U.S. PATENT DOCUMENTS 3,563,470 A * 2/1971 Suzuki .................. F23C 7/004
239/402
4,587,809 A * 5/1986 Ohmori ................ B01F 5/0451
60/737
(Continued)

FOREIGN PATENT DOCUMENTS

JP 01-273918 A 11/1989
JP 06-047954 A 6/1994
(Continued)

OTHER PUBLICATIONS

Written Opinion dated Sep. 22, 2014, issued by the International Searching Authority in counterpart International Application No. PCT/KR2014/002387 (PCT/ISA/237).
(Continued)

*Primary Examiner* — Qingzhang Zhou
(74) *Attorney, Agent, or Firm* — Sughrue Mion, PLLC

(57) ABSTRACT

Provided herein is a swirler for a gas turbine. The swirler includes a support plate including an injection part to inject a fuel supplied from the outside, a support shaft connected to the support plate, a guide part connected to the support plate and the support shaft and configured to mix a fluid introduced via a side surface of the support plate with the fuel injected from the injection part and to guide the mixture in at least one of a first direction and a second direction, the first direction being a longitudinal direction of the support shaft and the second direction being a direction swirling the support shaft, and a cover housing spaced apart from the
(Continued)

support plate and coupled to the guide part so as to form a transfer flow path of the fluid together with the guide part.

8 Claims, 4 Drawing Sheets

(58) Field of Classification Search
USPC .................................. 60/748; 239/461–524
See application file for complete search history.

(56) References Cited

U.S. PATENT DOCUMENTS

| | | | | |
|---|---|---|---|---|
| 4,681,532 | A | * | 7/1987 | Chung .................. F23C 7/008 110/264 |
| 5,016,443 | A | | 5/1991 | Shimizu et al. |
| 5,319,935 | A | * | 6/1994 | Toon ..................... F23C 6/047 239/403 |
| 5,623,826 | A | | 4/1997 | Ohtsuka et al. |
| 5,735,681 | A | * | 4/1998 | Cheng .................. F23C 7/002 110/260 |
| 7,334,410 | B2 | | 2/2008 | Creighton et al. |
| 2010/0205971 | A1 | | 8/2010 | Williams et al. |
| 2011/0005232 | A1 | | 1/2011 | Williams et al. |
| 2012/0227407 | A1 | * | 9/2012 | Reiss .................... F23R 3/14 60/737 |
| 2013/0199207 | A1 | | 8/2013 | Mane et al. |
| 2014/0318107 | A1 | * | 10/2014 | Tsumagari ........... F01N 3/0256 60/303 |

FOREIGN PATENT DOCUMENTS

| | | |
|---|---|---|
| JP | 07-091661 A | 4/1995 |
| JP | 2013-517440 A | 5/2013 |
| JP | 2013-160232 A | 8/2013 |
| KR | 10-2006-0044603 A | 5/2006 |

OTHER PUBLICATIONS

Search Report dated Sep. 22, 2014, issued by the International Searching Authority in counterpart International Application No. PCT/KR2014/002387 (PCT/ISA/210).

* cited by examiner

SWIRLER FOR GAS TURBINE

CROSS-REFERENCE TO RELATED APPLICATIONS

This application is a national stage entry of International Application No. PCT/KR2014/002387, filed on Mar. 21, 2014, and claims the benefit of Korean Patent Application No. 10-2013-0159386, filed on Dec. 19, 2013 in the United States Patent and Trademark Office, the disclosures of which are incorporated herein by reference in their entirety.

TECHNICAL FIELD

One or more embodiments of the present disclosure relate to swirler for a gas turbine.

BACKGROUND ART

A gas turbine is a type of heat engine which drives a turbine with high-temperature and high-pressure combustion gas and generally includes a compressor, a combustor, and a turbine. In this regard, the compressor is used to compress air, the combustor is used to disperse and combust a fuel, and then high-temperature and high-pressure air is expanded in the turbine, thereby producing electric power.

DETAILED DESCRIPTION OF THE INVENTION

Technical Problem

In a combustor, an area where flames are fixed at an appropriate position without being swept away is referred to as a central recirculation zone (CRZ). To continuously maintain combustion and to accelerate mixing of a fuel and an oxidizer in the combustor, it is important to maintain an appropriate CRZ according to flow.

For this purpose, a swirl needs to be applied to the flow. Generally, a nozzle for generating a swirl is called a swirler. Swirlers are classified into axial swirlers, radial swirlers, tangential swirlers, and cone swirlers depending upon the designed shape thereof.

The swirling strength of the swirler is determined by the shape of the designed swirler, and thus the swirling strength may not be controlled according to engine operating environments and driving conditions.

A general motor assembly as described above is disclosed in detail in Korean Patent Publication No. 1999-0063275 (the title of the invention: swirler for combustion chamber of gas turbine engine and fabrication method thereof).

Technical Solution

One or more embodiments of the present disclosure provide a swirler for a gas turbine which exhibits enhanced combustion efficiency.

According to an aspect of an embodiment, a swirler for a gas turbine includes a support plate including an injection part to inject a fuel supplied from the outside, a support shaft connected to the support plate, a guide part connected to the support plate and the support shaft and configured to mix a fluid injected via a side surface of the support plate and the fuel injected from the injection part and to guide the mixture in at least one of a first direction and a second direction, the first direction being a longitudinal direction of the support shaft and the second direction being a direction swirling the support shaft, and a cover housing spaced apart from the support plate and coupled to the guide part so as to form a transfer flow path of the fluid together with the guide part.

Advantageous Effects

According to one or more embodiments of the present disclosure, internal recirculation flow rate may be increased, which results in an increase in combustion efficiency.

BEST MODE

Figure 1:
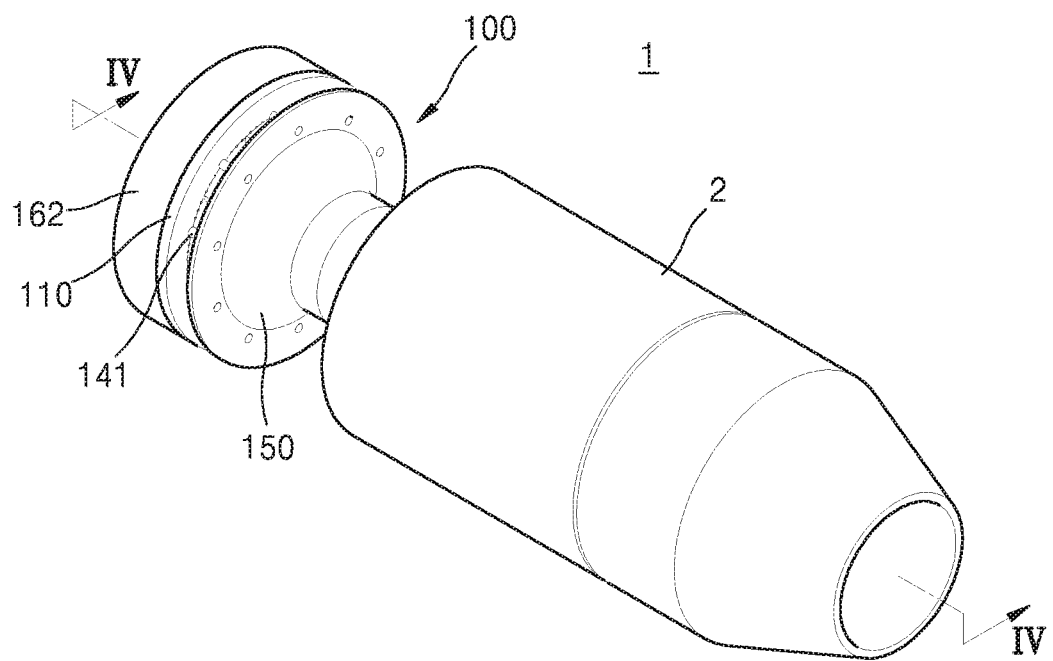
FIG. 1 is a perspective view partially illustrating a combustor including a swirler for a gas turbine according to an embodiment.

An embodiment of the present disclosure provides a swirler for a gas turbine including: a support plate including an injection part to inject a fuel supplied from the outside; a support shaft connected to the support plate; a guide part connected to the support plate and the support shaft and configured to mix a fluid introduced via a side surface of the support plate and the fuel injected from the injection part and to guide the mixture in at least one of a first direction and a second direction, the first direction being a longitudinal direction of the support shaft and the second direction being a direction swirling the support shaft; and a cover housing spaced apart from the support plate and coupled to the guide part so as to form a transfer flow path of the fluid together with the guide part.

In addition, the guide part may be installed at the support shaft so as to be in a spiral form in a longitudinal direction of the support shaft.

In addition, the support plate and the support shaft may be connected perpendicular to each other.

In addition, the guide part includes a plurality of guide parts, and the guide parts may be spaced apart from each other by a constant interval and form an inlet through which the fluid is introduced and an outlet through which the fluid guided between the guide parts is discharged.

In addition, the swirler may further include a fuel homogenizing part connected to a rear surface of the support plate and configured to homogeneously guide the fuel supplied from the outside to the injection part.

In addition, the injection part may inject the fuel in a moving direction of the fluid guided by the guide part.

In addition, the injection part may inject the fuel in a moving direction of the fluid guided by the guide part.

In addition, the swirler may further include a protrusion protruding from the support plate.

In addition, the protrusion may have a hole therein through which the fuel is injected.

In addition, the guide part and the protrusion may include a plurality of guide parts and a plurality of protrusions, respectively, and each protrusion may be disposed between two adjacent ones of the guide parts.

Another embodiment of the present disclosure provides a swirler for a gas turbine including: a fuel homogenizing part to temporarily store a fuel supplied from the outside and to homogenize the concentration of the fuel; a support plate connected to the fuel homogenizing part and provided with an injection hole connected to the fuel homogenizing part and supplying the fuel in a first direction, which is a longitudinal direction of a support shaft; the support shaft connected to the support plate; a guide part connected to the support plate and the support shaft and configured to mix a fluid introduced via a side surface of the support plate and the fuel injected from the injection hole and to guide the mixture in at least one of the first direction and a second direction, which is a direction swirling the support shaft; and a cover housing spaced apart from the support plate and coupled to the guide part so as to form a transfer flow path of the fluid together with the guide part.

In addition, the fuel homogenizing part may include: a storage case provided with an opening at a side thereof and a space therein and configured to temporarily store the fuel supplied from the outside; and a cover plate installed at the opening of the storage case and provided with an injection hole through which the fuel supplied from the outside is injected.

In addition, the injection part may inject the fuel in a moving direction of the fluid guided by the guide part.

In addition, the injection part may further include a protrusion protruding from the support plate.

In addition, the protrusion may have a hole through the fuel is injected.

In addition, the guide part and the protrusion may include a plurality of guide parts and a plurality of protrusions, respectively, and each protrusion may be disposed between two adjacent ones of the guide parts.

MODE OF THE INVENTION

One or more embodiments of the present disclosure will now be described in detail with reference to the accompanying drawings. However, the present disclosure may be embodied in many different forms and should not be construed as being limited to embodiments set forth herein. Rather, these embodiments are provided so that this disclosure will be thorough and complete, and will fully convey the scope of the invention to those skilled in the art, and the present disclosure is defined only by the scope of the following claims. Meanwhile, the terminology used herein is for the purpose of describing particular embodiments only and is not intended to be liming. As used herein, the singular forms are intended to include the plural forms as well, unless the context clearly indicates otherwise. The terms "comprises" and/or "comprising, when used in this specification, specify the presence of stated components, steps, operations, and/or elements, but do not preclude the presence or addition of one or more other components, steps, operations, and/or elements. The terms such as "first", "second", and the like are used to explain various components, rather than for restrictive meanings. Terms as used herein are used only for distinguishing one component from another component.

Figure 2:
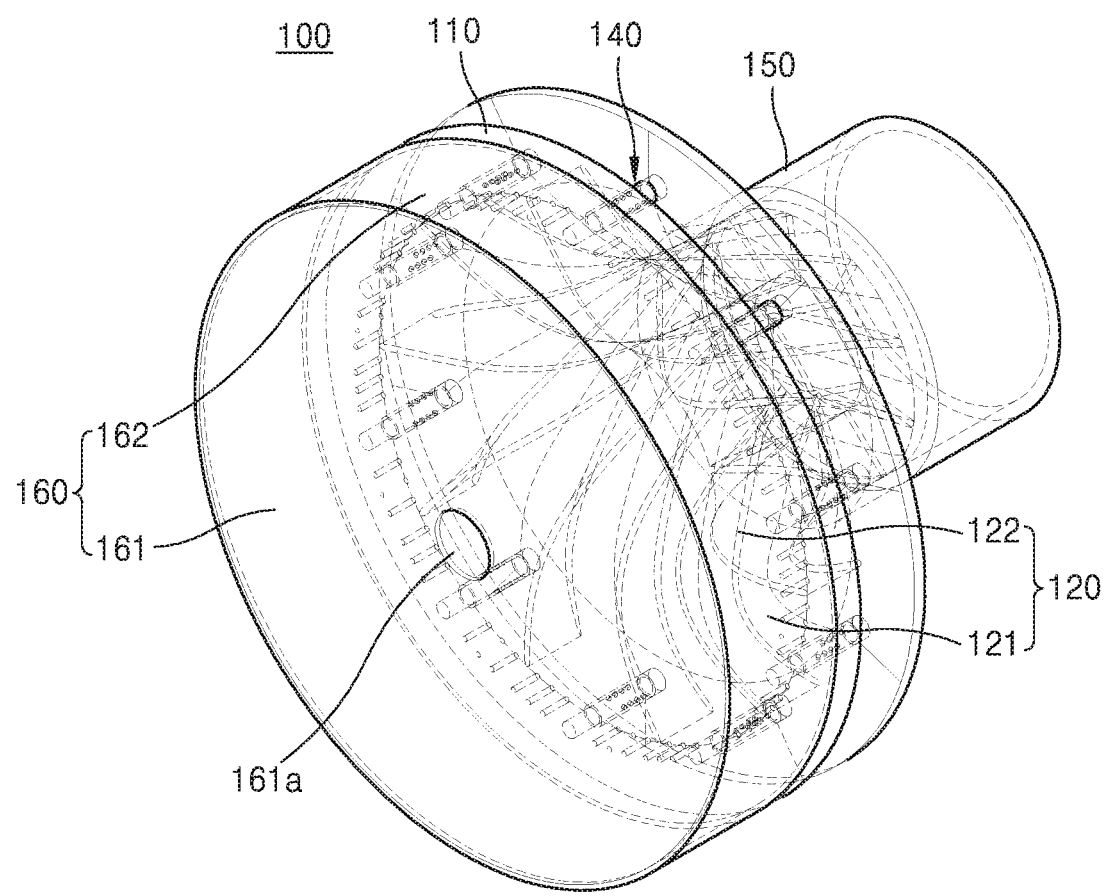
FIG. 2 is a perspective view illustrating the swirler illustrated in FIG. 1.
Figure 3:
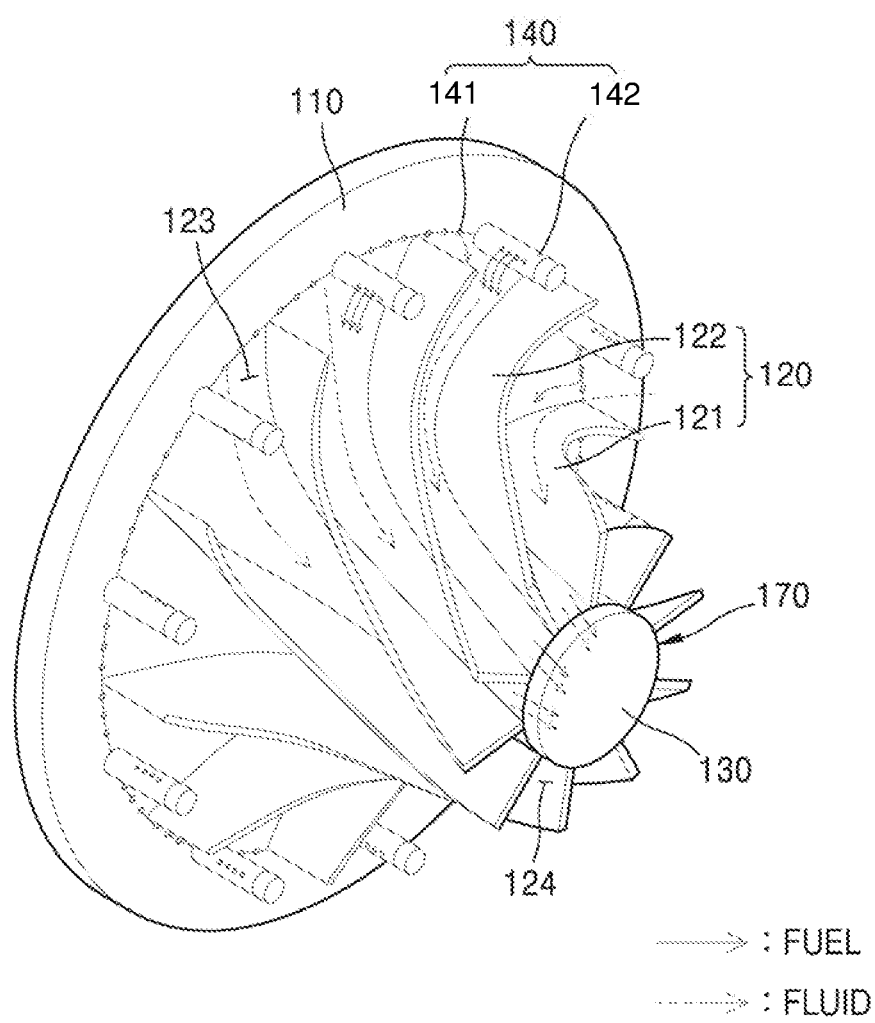
FIG. 3 is a perspective view partially illustrating the swirler illustrated in FIG. 2.

FIG. 1 is a perspective view partially illustrating a combustor 1 including a swirler 100 for a gas turbine according to an embodiment. FIG. 2 is a perspective view illustrating the swirler 100 illustrated in FIG. 1. FIG. 3 is a perspective view partially illustrating the swirler 100 illustrated in FIG. 2.

Referring to FIGS. 1 to 3, the combustor 1 may include a housing (not shown) to form an exterior appearance of the combustor 1. In addition, the combustor 1 may to include a case 2 installed inside the housing and configured to form a flow path together with an internal surface of the housing. In this regard, the swirler 100 may be connected to the case 2. The case 2 as described above may be provided with a space therein through which a fluid discharged from the swirler 100 moves. The combustor 1 having the structure described above may be connected to a compressor (not shown) to which a compressed fluid is supplied from the outside.

The swirler 100 may include a support plate 110 installed at the combustor 1. In this regard, the support plate 110 is in a plate form and thus may prevent a fluid from leaking to a rear surface of the support plate 110.

The support plate 110 may include an injection part 140 to inject a fuel supplied from the outside. In this regard, the injection part 140 may be in various forms. For example, the injection part 140 may include injection holes 141 penetrating the support plate 110. In addition, the injection part 140 may be connected to the support plate 110 and include a protrusion 142 connected to a cover housing 150 as described below and configured to inject the fuel between guide parts 120 as described below. In this regard, the protrusion 142 is provided with a plurality of holes and thus may inject a fuel in a flow direction of a fluid moving along the guide parts 120, together with the injection holes 141.

The injection part 140 may include at least one of the injection hole 141 and the protrusion 142. For convenience of explanation, however, a case in which the injection part 140 includes both the injection holes 141 and the protrusion 142 will be described below in detail.

In this regard, the injection holes 141 may penetrate the support plate 110 in an annular form similar to a circumferential surface of the support plate 110. In addition, the protrusion 142 may be connected to the support plate 110 in an annular form similar to the case of the injection holes 141, and the protrusion 142 may include a plurality of protrusions 142 and connect the support plate 110 and the cover housing 150 as described below.

The protrusions 142 may be provided with holes. In this regard, the holes formed in the protrusions 142 may be configured so as for a fuel to be injected therethrough into a space between the guide parts 120.

The swirler 100 may include a support shaft 130 connected to the support plate 110. In this regard, the support shaft 130 may penetrate the support plate 110 and fixed to the combustor 1. In addition, the support shaft 130 may form a certain angle with respect to a surface of the support plate 110. In particular, the support shaft 130 may be disposed perpendicular to the surface of the support plate 110. The support shaft 130 may be installed integrally with the support plate 110, and may also be separately installed and coupled to the support plate 110. Hereinafter, a case in which the support shaft 130 and the support plate 110 are installed in an integral form will be described mainly for convenience of explanation.

The swirler 100 may include the guide part 120 installed at the support plate 110 and the support shaft 130 and configured to guide a fluid injected via a side surface of the support plate 110 in at least one of a first direction, which is a longitudinal direction of the support shaft 130, and a second direction, which is a direction swirling the support shaft 130.

The guide part 120 may include a plurality of guide parts 120. In this regard, the guide parts 120 may include a first guide part 121 and a second guide part 122. In particular, the first guide part 121 and the second guide part 122 may be disposed alternately with respect to each other and form an inlet 123 through which a fluid is injected and an outlet 124 through which the fluid is discharged.

In this regard, the inlet 123 and the outlet 124 may have different widths. For example, the inlet 123 may have a smaller width than that of the outlet 124. In addition, a distance between the first and second guide parts 121 and 122 may decrease towards the outlet 124 away from the inlet 123. Thus, a flow rate of the fluid introduced via the inlet 123 increases and the fluid may be discharged via the outlet 124, accordingly.

The first guide part 121 may be in the same or similar form to that of the second guide part 122. Hereinafter, the first guide part 121 will be mainly described in detail for convenience of explanation.

The first guide part 121 may be in a spiral form in a longitudinal direction of the support shaft 130. For example, a portion of the first guide part 121 may be connected to the support plate 110, and another portion thereof may be configured to rotate along the circumferential surface of the support shaft 130 in a longitudinal direction of the support shaft 130. In this regard, the portion of the first guide part 121, disposed at the support plate 110, may be disposed perpendicular to the circumferential surface of the support plate 110.

In addition, the swirler 100 may include the cover housing 150 to cover a top surface of the guide parts 120. In this regard, the cover housing 150 may cover a top surface of a flow path formed by the first and second guide parts 121 and 122 and thus to prevent a fluid from leaking to the outside.

The cover housing 150 may be installed or omitted according to exemplary embodiments of the present disclosure. In this regard, a case in which the cover housing 150 is installed will be mainly described below in detail for convenience of explanation.

The swirler 100 may include a fuel homogenizing part 160 disposed at a rear surface of the support plate 110. In this regard, the fuel homogenizing part 160 may temporarily store a fuel supplied from the outside and then supply the fuel to the injection part 140 at a constant pressure.

The fuel homogenizing part 160 may include a cover plate 161 provided with an injection hole 161a through which a fuel is injected. In addition, the fuel homogenizing part 160 may include a storage case 162 provided with a space therein and configured to temporarily store a fuel.

The swirler 100 may include an igniter 170 installed at the support shaft 130. In this regard, the igniter 170 may include any kinds of devices and structures capable of applying energy to a flowing fuel. In particular, the igniter 170 may be the same or similar to an igniter used in general gas turbines and thus a detailed description thereof will not be provided herein.

Meanwhile, the swirler 100 may be fabricated using various methods. For example, the swirler 100 may be fabricated by forging or molding. In addition, the swirler 100 may be fabricated by cutting.

In addition, the swirler 100 may be made of various materials. For example, the swirler 100 may be made of a metal material, in particular, a metal material with heat resistance and corrosion resistance.

Figure 4:
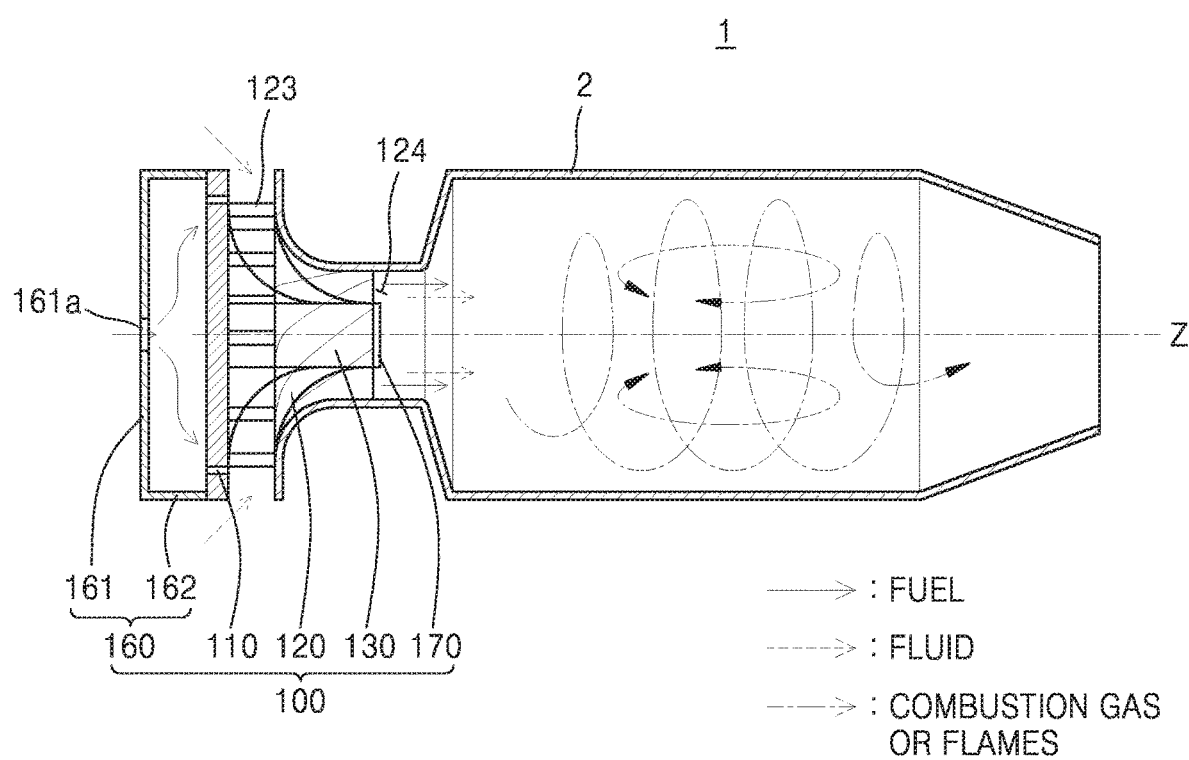
FIG. 4 is a cross-sectional view taken along line IV-IV of FIG. 1.

FIG. 4 is a cross-sectional view taken along line IV-IV of FIG. 1.

Referring to FIG. 4, when the combustor 1 operates, air compressed in the compressor may be supplied to the swirler 100 along a flow path formed by the case 2 and the housing, as described above.

As described above, when the fluid is supplied to the swirler 100, the fluid may be introduced into the inlet 123 and move between the first and second guide parts 120. In this regard, a flow rate of the fluid may increase as described above.

When the fluid is introduced, a fuel injected via the injection holes 141 and the protrusions 142 may mix with the fluid and the mixture may move to the outlet 124 through between the first and second guide parts 120. In this regard, the cover housing 150 may form a flow path together with the first and second guide parts 120 and the support shaft 130 and thus guide the fluid and the fuel by swirling.

The fluid and fuel moving as described above may be discharged to an inside of the case 2 from the swirler 100 through the outlet 124. In this regard, the fluid and the fuel may swirl while moving along surfaces or the like of the first and second guide parts 120. In addition, the fluid and the fuel may be partially injected in a longitudinal direction is of the support shaft 130 while linearly passing between the first and second guide parts 120.

Meanwhile, when the fluid and the fuel move as described above and are injected into the case 2 via the outlet 124, the igniter 170 may operate to combust the fuel. The fuel undergoes a combustion reaction with the fluid to form a combustion gas and flames, and the combustion gas and the flames may be discharged to the case 2.

In this regard, in the case of the fluid and the fuel moving in the first and second directions, recirculation of a combustion gas and flames may occur inside of the case 2. In particular, as illustrated in FIG. 3, rotation and circulation occur in the swirler 100, whereby the fuel and the fluid may be smoothly mixed and the amount of the fluid needed for combustion may be sufficient.

In addition, when the fluid and the fuel flow as described above, a component swirling around the support shaft 130 increases a recirculation flow rate and thus increases combustion efficiency due to a decrease in an incomplete combustion gas and acquires flame stability. However, when the amount of fluid swirling around the support shaft 130 is too large, a combustion gas formed after combustion of the fuel remains inside the case 2 for a long period of time, which is a cause of incomplete combustion.

In this regard, as described above, the swirler 100 also provides flowing of the fluid and the fuel in the first direction, i.e., a longitudinal direction of the support shaft 130 and thus the combustion gas generated after the combustion may be rapidly discharged.

Thus, the swirler 100 may exhibit enhanced combustion efficiency and acquire flame stability by increasing the recirculation flow rate inside the combustor 1 and simultaneously form flow in a longitudinal direction of the support shaft 130, which may prevent generation of contaminants.

In addition, the swirler 100 has a simple structure and thus may be simply manufactured and accordingly, manufacturing costs of the swirler 100 may be low and the swirler 100 may be repaired and replaced rapidly.

While the present disclosure has been described with reference to exemplary embodiments thereof, it will be understood by those of ordinary skill in the art that various changes in form and details may be made therein without departing from the spirit and scope of the present disclosure as defined by the following claims.

INDUSTRIAL APPLICABILITY

One embodiment of the present disclosure relates to a swirler for a gas turbine which has enhanced combustion efficiency, and exemplary embodiments of the present disclosure may be applied to a gas turbine including a combustor and a compressor, an industrial turbo engine, and the like.

The invention claimed is:

1. A swirler for a gas turbine, the swirler comprising: a support plate comprising an injection part to inject a fuel supplied from the outside; a support shaft connected to the support plate; a plurality of guide parts, each of the plurality of guide parts being directly connected to the support plate and the support shaft, respectively, and configured to mix a fluid introduced via a side surface of the support plate with the fuel injected from the injection part and to guide the a mixture in at least one of a first direction and a second direction, the first direction being a longitudinal direction of the support shaft and the second direction being a direction swirling the support shaft; and a cover housing spaced apart from the support plate and covering a top surface of the plurality of guide parts so as to form a transfer flow path of the fluid together with the plurality of guide parts; and a protrusion protruding from the support plate comprising a plurality of protrusions, wherein each of the plurality of protrusions is disposed between two adjacent guide parts among the plurality of guide parts.

2. A swirler for a gas turbine, the swirler comprising: a support plate comprising an injection part to inject a fuel supplied from the outside; a support shaft connected to the support plate; a guide part connected to the support plate and the support shaft and configured to mix a fluid introduced via a side surface of the support plate with the fuel injected from the injection part and to guide a mixture in at least one of a first direction and a second direction, the first direction being a longitudinal direction of the support shaft and the second direction being a direction swirling the support shaft; and a cover housing spaced apart from the support plate and covering a top surface of the guide part so as to form a transfer flow path of the fluid together with the guide part, wherein the guide part is installed at the support shaft so as to be in a spiral form in the longitudinal direction of the support shaft, and wherein the injection part comprises a plurality of injection holes formed on the support plate and a plurality of protrusions protruding from the support plate, the plurality of protrusions being spaced apart from the plurality of injection holes.

3. The swirler of claim 1, wherein the support plate and the support shaft are connected perpendicular to each other.

4. The swirler of claim 1, wherein the plurality of guide parts are spaced apart from each other by a constant interval so as to form an inlet through which the fluid is introduced and an outlet through which the fluid guided between the plurality of guide parts is discharged.

5. The swirler of claim 1, further comprising a fuel homogenizing storage connected to a rear surface of the support plate and configured to homogeneously guide the fuel supplied from the outside to the injection part.

6. The swirler of claim 5, wherein the fuel homogenizing storage comprises:
   a storage case provided with an opening at a side thereof and a space therein and configured to temporarily store the fuel supplied from the outside; and
   a cover plate installed at the opening of the storage case and provided with an injection hole through which the fuel supplied from the outside is injected.

7. The swirler of claim 1, wherein the injection part injects the fuel in a moving direction of the fluid guided by the plurality of guide parts.

8. The swirler of claim 1, wherein the protrusion has a hole through which the fuel is injected.

* * * * *